Dec. 29, 1959 R. A. WRAIGHT 2,918,953
WORK HOLDING ATTACHMENT FOR CIRCULAR SAWS
Filed June 18, 1958 2 Sheets-Sheet 1
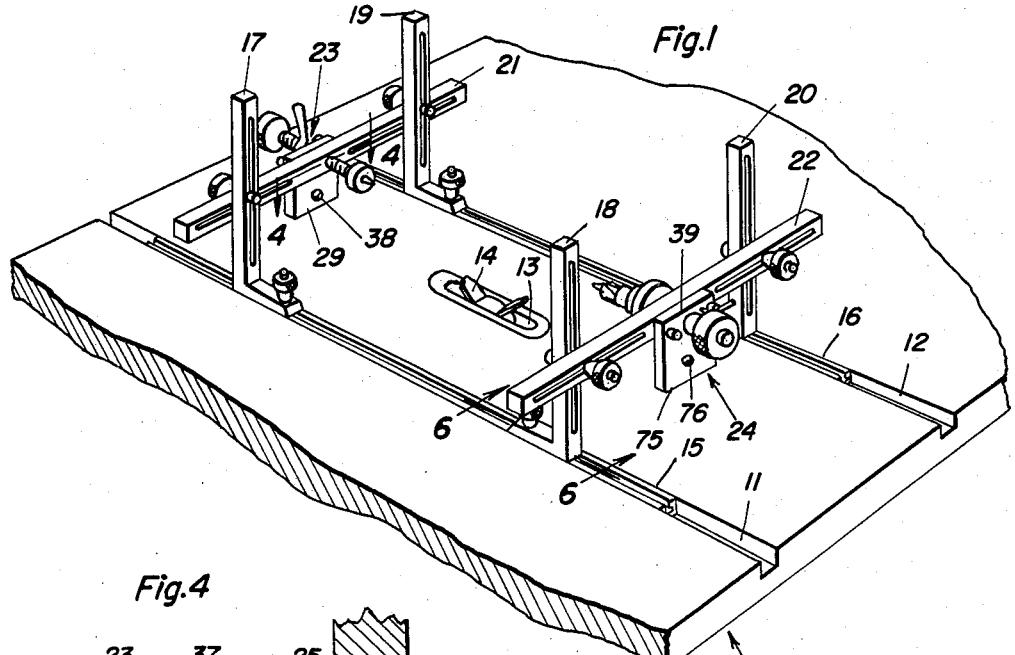
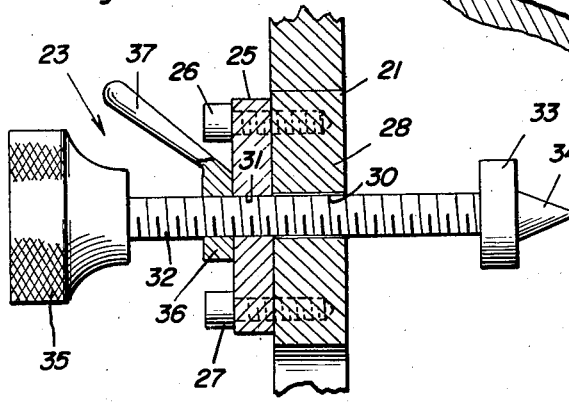
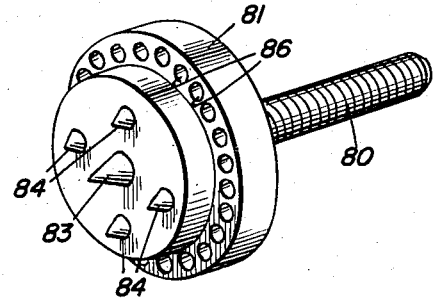
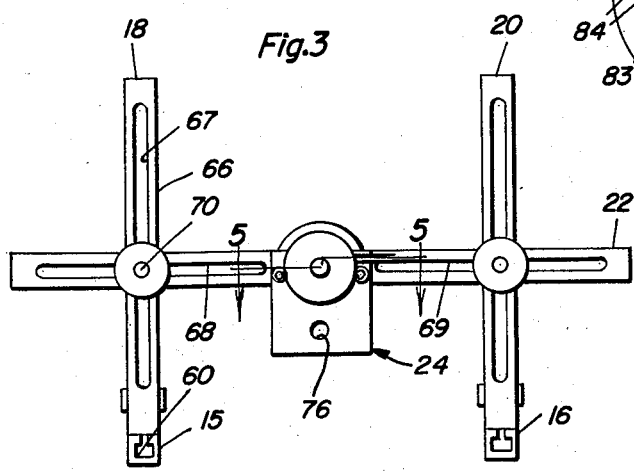
Robert Avery Wraight
INVENTOR.

Dec. 29, 1959 R. A. WRAIGHT 2,918,953
WORK HOLDING ATTACHMENT FOR CIRCULAR SAWS
Filed June 18, 1958 2 Sheets-Sheet 2
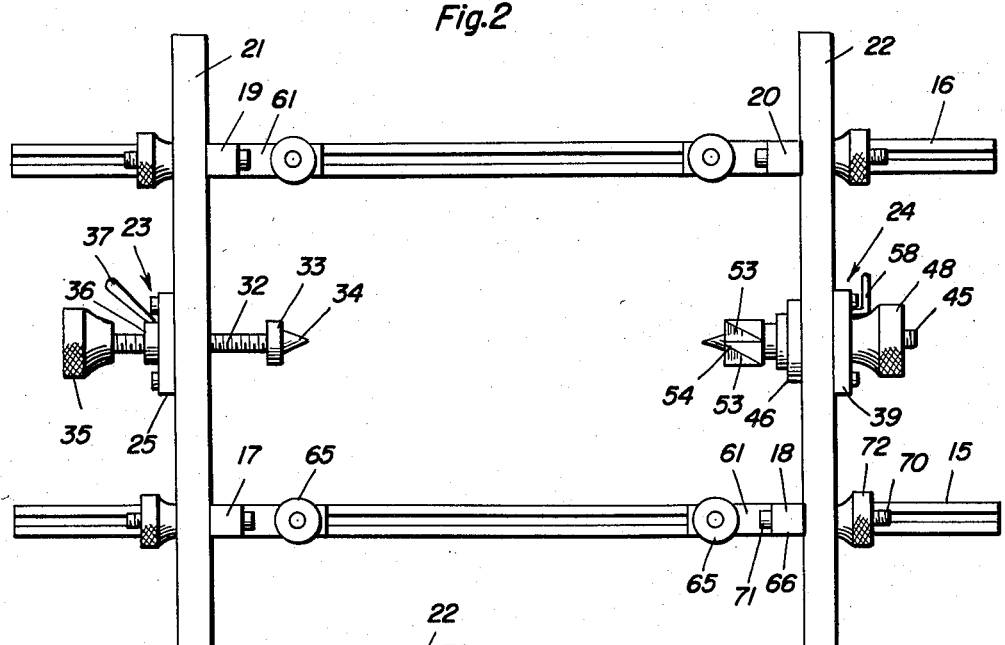
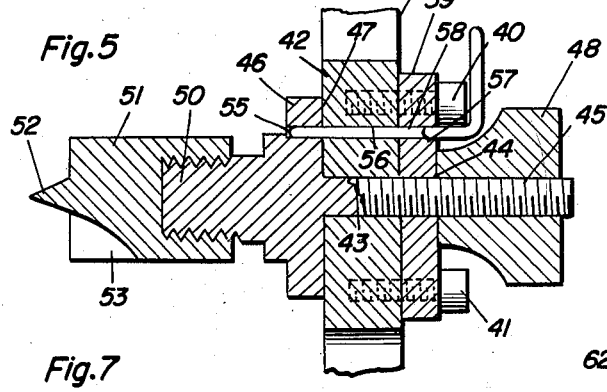
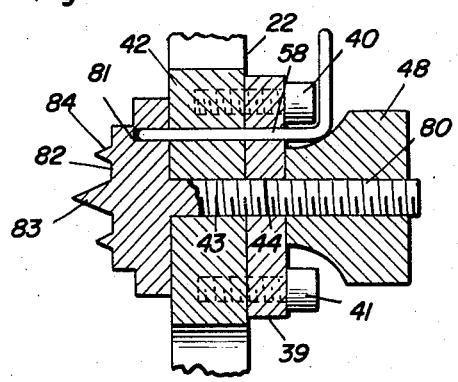
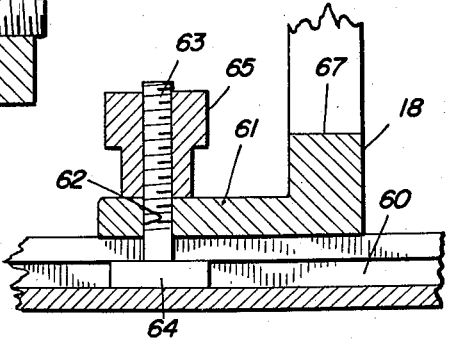
Robert Avery Wraight
INVENTOR.

United States Patent Office 2,918,953
Patented Dec. 29, 1959

2,918,953

WORK HOLDING ATTACHMENT FOR CIRCULAR SAWS

Robert Avery Wraight, Windsor, Ontario, Canada

Application June 18, 1958, Serial No. 742,872

7 Claims. (Cl. 144—253)

This invention relates to a work holding attachment for circular saws and pertains more particularly to such a device in which desired fluting and similar operations may be performed on a workpiece.

Frequently in woodworking, it is desirable to effect fluting, notching and the like on a workpiece and it is a primary object of this invention to provide a work holding attachment for circular saws whereby a workpiece may be held in fixed position and vertically adjusted as to height in order to engage the same with a circular saw blade or cutter attachment and permitting the workpiece to be moved longitudinally for fluting and the like.

Another object of the invention is to provide a work holding attachment particularly adapted for use on a circular saw table for performing various and desired cutting operations on a workpiece held therein wherein the work holding attachment is characterized by the utilization of a pair of spaced, parallel rail members adapted to be slidably received within the ways in the saw table, the opposite end portions of the rails carrying uprights which in turn are rigidly interconnected, between the corresponding ends of the rails, by horizontal beam members whereby the entire assemblage is rigidly interconnected together and with work engaging centering means being carried by the beams for non-rotatably holding a workpiece therebetween and at an elevated position with respect to the saw table.

Still another object of this invention is to provide a work holding attachment of the character described including a pair of spaced, parallel rail members for slidable reception within the ways in a circular saw table, there being a pair of uprights rigidly affixed but longitudinally adjustable on the rails and disposed normally adjacent the opposite end portions thereof and having beam members, horizontally disposed, in interconnecting relationship between those uprights at corresponding ends of the rails whereby the entire assemblage is rigidly interconnected and held together, the uprights being longitudinally adjustable on the rails and the beams being laterally adjustable with respect to the uprights and carrying, in their central portions, work engaging centers for non-rotatably fixing the associated work piece in horizontally extending position therebetween and at an elevated position relative to the saw table whereby the circular saw blade and/or the special cutting attachments adapted to be received on the arbor thereof may perform desired cutting operations on the underside of the workpiece as the rails are moved longitudinally back and forth within the ways of the table.

A further object of this invention is to provide a work holding attachment for circular saws wherein a workpiece is held in parallel, elevated relationship above the saw table and for longitudinal movement with respect thereto so as to perform longitudinal grooving, fluting or the like on the workpiece.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a portion of a saw table showing the work holding attachment operatively associated therewith and in position to receive a workpiece between the centers thereof;

Figure 2 is a plan view of the work holding attachment illustrating the disposition of the component parts thereof relative to each other;

Figure 3 is an end elevational view of the right side of the assembly shown in Figure 2;

Figure 4 is an enlarged horizontal section taken substantially along the plane of section line 4—4 of Figure 1 and illustrating details of one of the work engaging centers;

Figure 5 is an enlarged horizontal section taken substantially along the plane of section line 5—5 in Figure 3 and illustrating details of the other work engaging center;

Figure 6 is an enlarged vertical section taken substantially along the plane of section line 6—6 in Figure 1 illustrating details of the manner in which the uprights are attached to the rail members;

Figure 7 is a view similar to Figure 5 but illustrating a modified form of center element associated therewith; and Figure 8 is an enlarged perspective view of the work engaging center illustrated in Figure 7.

Referring at this time more particularly to Figure 1, the reference numeral 10 indicates in general the table of a circular saw which is provided with the usual grooves or ways 11 and 12 therein. Between these ways 11 and 12 is an opening 13 through which the cutter or saw 14 attached to the saw arbor (not shown) projects, all of which is in accordance with conventional construction.

The work holding attachment consists essentially of a pair of spaced, parallel rail members 15 and 16 received in the respective ways 11 and 12 and being longitudinally slidable therewith. Connected to the rail 15 are a pair of uprights 17 and 18 normally disposed adjacent the opposite end portions thereof and, similarly, attached to the rail 16 are a pair of uprights 19 and 20 similarly disposed with respect thereto as the uprights 17 and 18 are disposed with respect to the rail member 15. Rigidly interconnecting corresponding uprights 17, 19 and 18, 20 are transverse, horizontal beam members 21 and 22, which beam members serve to rigidly interconnect and hold together the entire assemblage. The beam 21 carries, adjacent the central portion thereof, a work engaging center assembly indicated generally by the reference character 23 and, similarly, the beam 22 carries adjacent the central portion thereof a work engaging center assembly indicated generally by the reference character 24.

The centering assembly 23 is indicated more clearly in Figure 4 and will be seen to consist of a plate 25 having a pair of apertures adjacent the opposite sides thereof to receive therethrough the fastening elements 26 and 27 which extend therethrough and into threaded recesses in the central portion 28 of the associated beam 21. The lower portion 29 of the plate extends below the beam 21, see particularly Figure 1. The central portion 28 of the beam is provided with an opening 30 therethrough and, in registry therewith, the plate 25 is provided with a threaded opening 31 through which the spindle 32 is threadedly projected in the manner illustrated. The inner end of the spindle 32 is provided with a rigid disk or collar 33 having on its inner face the conical centering point 34 which is adapted to be inserted into a corresponding end of a workpiece, as is conventional. The opposite end of the spindle 32 is provided with a hand knob 35 threadedly engaged therewith and by means of which the spindle 32 is rotated to thread the same for longitudinal adjustment relative to the plate 25 so as to properly engage with the associated workpiece. A lock nut 36 is engaged on the spindle 32 and is provided with an angularly offset handle portion 37 so that this nut may be threaded on the spindle 32 so as to jam against the outer face of the plate 25 and hold the spindle and consequently the center piece 34 in a desired position relative to the beam 21.

The lower portion 29 of the plate is provided with a threaded opening 38 which is adapted to receive the spindle 32, as desired, in underswung relationship as to the beam 21 should it be desirable to locate the workpiece in such position.

The assembly 24 is best illustrated in Figure 5 and will be seen to consist of a plate 39, similar to the plate 25 provided with openings receiving the fasteners 40 and 41 which extend into threaded apertures in the central portion 42 of the associated beam 22 serving to rigidly affix the plate thereto. The central portion 42 of the beam is provided with an opening 43 and the plate 39 is provided with a corresponding registering opening 44 receiving therethrough the spindle 45 of the centering piece. On the inner side, the centering piece is provided with an enlarged shoulder 46 having its outer face 47 engaged against the inner face of the beam portion 42 and serving to rigidly clamp the centering piece to the beam is the nut element 48 in the form of a hand knob for easy manipulation.

The inner extremity of the centering piece is provided with a nose portion 50 which is externally threaded as shown to receive, removably, a work engaging center element 51. This center element is provided with a conical nose piece 52 and is fluted as at 53 to provide the teeth 54 which will engage the workpiece and prevent relative rotation thereof with respect to the center element 51.

The shoulder element 46 is provided with a series of circumferentially spaced openings 55 therein selectively registrable with openings 56 and 57 in the portion 42 and plate 39 respectively so that an L-shaped anchor pin 58 may be inserted through these several openings and lock the centering device and consequently the associated workpiece in any one of a desired number of angularly adjusted positions relative to the cutter 14 of the saw.

The rails 15 and 16 are provided with T-slots 60 opening upon the upper sides thereof and extending longitudinally completely therethrough. Each of the uprights is provided with a horizontal leg portion 61 provided with a vertical opening 62 receiving the shank 63 of a T headed bolt, the head portion of which is indicated by the reference character 64.

A hand manipulated nut 65 serves to rigidly clamp the foot 61 of each upright in desired longitudinally adjusted position along the rails 15 and 16.

The vertical portion 66 of each upright is provided with a vertically elongate slot 67 extending substantially the full extent thereof, see particularly Figure 3, and by means of this slot, the associated beams 21 and 22 are vertically adjustable relative to the uprights. Similarly, the beams 21 and 22 are provided with horizontally elongate slots 68 and 69 on opposite sides of their central portions and extending substantially to the opposite ends thereof and received through the slots 67 and the corresponding slots 68 and 69 are the bolt elements 70, see particularly Figure 2, having their head portions 71 engaged against the inner faces of the uprights and with their threaded shank portions extending therethrough and through the beams 21 and 22 to be provided with hand knob nuts 72 serving to rigidly affix the beams relative to the uprights both for vertical and lateral adjustment with respect thereto.

The lower portion 75 of plate 39, see particularly Figure 1, is provided with a bore or opening 76 for alternatively receiving the spindle 45 therethrough to provide the centering piece in underslung relationship to the associated beam 22, similarly as was previously described in conjunction with the centering assembly 23.

Referring at this time more particularly to Figures 7 and 8, a slightly modified form of centering piece for the assembly 24 is shown. In this particular form of the invention, the centering piece includes a threaded shank 80 projecting through the previously described openings 43 and 44 for engagement with the nut 47. On the inner side of the beam 22, the centering piece is provided with an enlarged head portion 81 having an inner face 82 provided with a centrally disposed conical piercing nose 83 and, circumferentially and radially spaced relative thereto, with a plurality of auxiliary nose pieces 84. The outer periphery of the head is provided with a series of circumferentially spaced openings 86 for selectively receiving the locking pin 58 previously described, so as to hold the centering piece in a desired adjusted rotational position.

In use of the assemblage, the workpiece is held by the centering assemblies 23 and 24 in any desired vertically and laterally adjusted position relative to the saw table and a cuter 14 for imparting the desired contour of the flute or groove to be cut longitudinally in the workpiece is associated with the saw arbor. Then, with the saw operating, the workpiece is moved longitudinally for cutting action thereon by the cutter 14 by moving the work holding attachment back and forth within the ways 11 and 12. Since the centering pieces non-rotatably hold the workpiece therebetween and since the centering assembly 24 includes provision for locking the same in any desired angular position relative to the beam 22, by changing the adjusted position of the centering assembly 23, a series of equally circumferentially spaced grooves or flutes may be cut in a workpiece, as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A work holding attachment for use in conjunction with circular saws, comprising a pair of parallel rails adapted to fit within the ways in a circular saw table, a pair of uprights on each rail fixed to the opposite ends thereof, a horizontal beam fixed to each upright at corresponding ends of said rails so as to rigidly interconnect such rails, and a work engaging center fixed to each beam for holding a workpiece therebetween.

2. In a circular saw assembly having a table provided with spaced parallel ways, a rail received in each way, a pair of uprights fixed to the opposite ends of each rail, a horizontal beam fixed to and extending between the uprights at corresponding ends of said rails to rigidly interconnect the same, and a work engaging center fixed to the central portion of each beam for holding a workpiece therebetween.

3. A work holding attachment for use in conjunction with circular saws, comprising a pair of parallel rails adapted to fit within the ways in a circular saw table, a pair of uprights on each rail fixed to the opposite ends thereof, a horizontal beam fixed to each upright at corresponding ends of said rails so as to rigidly interconnect such rails, and a work engaging center fixed to each beam for holding a workpiece therebetween, said uprights being longitudinally adjustable on said rails to alter the spacing between said work engaging centers.

4. A work holding attachment for use in conjunction with circular saws, comprising a pair of parallel rails adapted to fit within the ways in a circular saw table, a pair of uprights on each rail fixed to the opposite ends thereof, a horizontal beam fixed to each upright at corresponding ends of said rails so as to rigidly interconnect such rails, and a work engaging center fixed to each beam for holding a workpiece therebetween, said uprights being longitudinally adjustable on said rails to alter the spacing between said work engaging centers, and said beams being vertically adjustable on said uprights to accommodate for workpieces of varying dimensions.

5. A work holding attachment for use in conjunction with circular saws, comprising a pair of parallel rails adapted to fit within the ways in a circular saw table, a pair of uprights on each rail fixed to the opposite ends thereof, a horizontal beam fixed to each upright at corresponding ends of said rails so as to rigidly interconnect such rails, and a work engaging center fixed to each beam for holding a workpiece therebetween, one of said work engaging centers being provided with means for preventing rotation of a workpiece relative thereto and said one center being rotatable within its associated beam and provided with means for holding said one center in selected rotationally adjusted positions.

6. In a circular saw assembly having a table provided with spaced parallel ways, a rail received in each way, a pair of uprights fixed to the opposite ends of each rail, a horizontal beam fixed to and extending between the uprights at corresponding ends of said rails to rigidly interconnect the same, and a work engaging center fixed to the central portion of each beam for holding a workpiece therebetween, said uprights being longitudinally adjustable on said rails to alter the spacing between said work engaging centers.

7. In a circular saw assembly having a table provided with spaced parallel ways, a rail received in each way, a pair of uprights fixed to the opposite ends of each rail, a horizontal beam fixed to and extending between the uprights at corresponding ends of said rails to rigidly interconnect the same, and a work engaging center fixed to the central portion of each beam for holding a workpiece therebetween, said uprights being longitudinally adjustable on said rails to alter the spacing between said work engaging centers, and said beams being vertically adjustable on said uprights to accommodate for workpieces of varying dimensions.

References Cited in the file of this patent

UNITED STATES PATENTS

| | | |
|---|---|---|
| 481,983 | Thom | Sept. 6, 1892 |
| 667,933 | Eastman | Feb. 12, 1901 |
| 2,546,957 | Ray | Mar. 27, 1951 |
| 2,623,419 | Wales | Dec. 30, 1952 |
| 2,668,568 | Budd | Feb. 9, 1954 |

FOREIGN PATENTS

| | | |
|---|---|---|
| 262,616 | Switzerland | Oct. 17, 1949 |